US009480110B2

(12) United States Patent
Yu (10) Patent No.: US 9,480,110 B2
(45) Date of Patent: Oct. 25, 2016

(54) LED DRIVER CIRCUIT HAVING EFFICIENCY-IMPROVING FUNCTION

(71) Applicant: LUMIGREEN CO., LTD., Seongnam-si (KR)

(72) Inventor: Sang-Woo Yu, Seongnam-si (KR)

(73) Assignee: LUMIGREEN CO., LTD. (KR)

( * ) Notice: Subject to any disclaimer, the term of this patent is extended or adjusted under 35 U.S.C. 154(b) by 54 days.

(21) Appl. No.: 14/376,990

(22) PCT Filed: Feb. 19, 2013

(86) PCT No.: PCT/KR2013/001277
§ 371 (c)(1),
(2) Date: Aug. 6, 2014

(87) PCT Pub. No.: WO2013/133547
PCT Pub. Date: Sep. 12, 2013

(65) Prior Publication Data
US 2015/0305102 A1    Oct. 22, 2015

(30) Foreign Application Priority Data

Mar. 7, 2012 (KR) .................. 10-2012-0023137

(51) Int. Cl.
*H05B 37/00*  (2006.01)
*H05B 33/08*  (2006.01)

(52) U.S. Cl.
CPC ...... *H05B 33/0815* (2013.01); *H05B 33/0812* (2013.01); *H05B 33/0851* (2013.01); *Y02B 20/343* (2013.01)

(58) Field of Classification Search
CPC .......... H05B 33/0803; H05B 33/0809; H05B 33/0815

USPC ........ 315/185 R, 200 R, 201, 291, 294, 297, 315/307, 312
See application file for complete search history.

(56) References Cited

U.S. PATENT DOCUMENTS 8,742,674 B2 *   6/2014   Shteynberg ........ H05B 33/0815
                                                    315/201
2005/0225259 A1* 10/2005   Green ................ H02M 3/1588
                                                    315/224

(Continued)

FOREIGN PATENT DOCUMENTS

JP    2011003467      1/2011
KR    100877521     12/2008

(Continued)

OTHER PUBLICATIONS

International Search Report—PCT/KR2013/001277 dated Apr. 26, 2013.

*Primary Examiner* — Jason M Crawford
(74) *Attorney, Agent, or Firm* — Cantor Colburn LLP (57) ABSTRACT

An LED driving circuit having an efficiency improvement function and connected to an alternating current (AC) power supply, includes: a rectifier circuit that rectifies the AC power supply; a control circuit connected to an output of the rectifier circuit; an LED load and a constant-current circuit that are connected to an output of the control circuit in series; a capacitor that is connected in parallel to the LED load and the constant-current circuit that are connected in series to each other, the capacitor smoothing the output of the rectifier circuit; and a detection circuit that detects whether the rectified voltage exceeds a predetermined particular voltage value that is equal to or greater than the sum of a voltage applied to the LED load when the LED load is turned on and a voltage applied to the constant-current circuit at a time when the LED load starts being turned on.

9 Claims, 9 Drawing Sheets

(56) References Cited

U.S. PATENT DOCUMENTS

| | | | |
|---|---|---|---|
| 2008/0224636 A1* | 9/2008 | Melanson | H05B 33/0815 315/307 |
| 2010/0026208 A1* | 2/2010 | Shteynberg | H05B 33/0815 315/297 |
| 2010/0045210 A1* | 2/2010 | Hariharan | H05B 33/0815 315/297 |
| 2010/0207536 A1* | 8/2010 | Burdalski | H05B 33/0818 315/224 |
| 2011/0080112 A1* | 4/2011 | Shearer | H05B 33/0815 315/291 |
| 2012/0043902 A1* | 2/2012 | Kanamori | H05B 33/0815 315/223 |
| 2012/0119674 A1* | 5/2012 | Lee | H05B 33/0812 315/294 |
| 2012/0181941 A1* | 7/2012 | Kimura | H05B 33/0815 315/200 R |
| 2012/0262084 A1* | 10/2012 | Liu | H05B 33/0815 315/250 |
| 2012/0286684 A1* | 11/2012 | Melanson | H02M 1/4225 315/224 |
| 2013/0141008 A1* | 6/2013 | Chang | H05B 33/0815 315/291 |
| 2013/0221867 A1* | 8/2013 | Deppe | H05B 33/0809 315/224 |

FOREIGN PATENT DOCUMENTS

| | | |
|---|---|---|
| KR | 100916850 | 9/2009 |
| KR | 1020090128652 | 12/2009 |
| KR | 101018171 | 2/2011 |

* cited by examiner

FIG. 1

*Prior Art*

FIG. 2

*Prior Art*

FIG. 3

*Prior Art*

FIG. 4

*Prior Art*

LED DRIVER CIRCUIT HAVING EFFICIENCY-IMPROVING FUNCTION

TECHNICAL FIELD

The present invention relates to improvement in efficiency of a light emitting diode (LED) driving circuit for illumination that uses a constant-current circuit at a load side of the LED driving circuit.

BACKGROUND ART

A conventional incandescent lamp used at home, in an office or a factory has large power consumption, a large degree of heat dissipation, and a short life-span. A fluorescent lamp that supplements disadvantages of the incandescent lamp has low power consumption compared to the incandescent lamp but still has a short life-span. Thus, in these days, a light emitting diode (LED) illumination device that uses an LED having low power consumption and a dramatically-increasing life-span compared to the incandescent lamp has been widely used.

In addition, since brightness at an LED load is uniform only when a constant current flows through the LED load, it is essential that the constant current flows through the LED load in the LED driving circuit.

Figure 1:
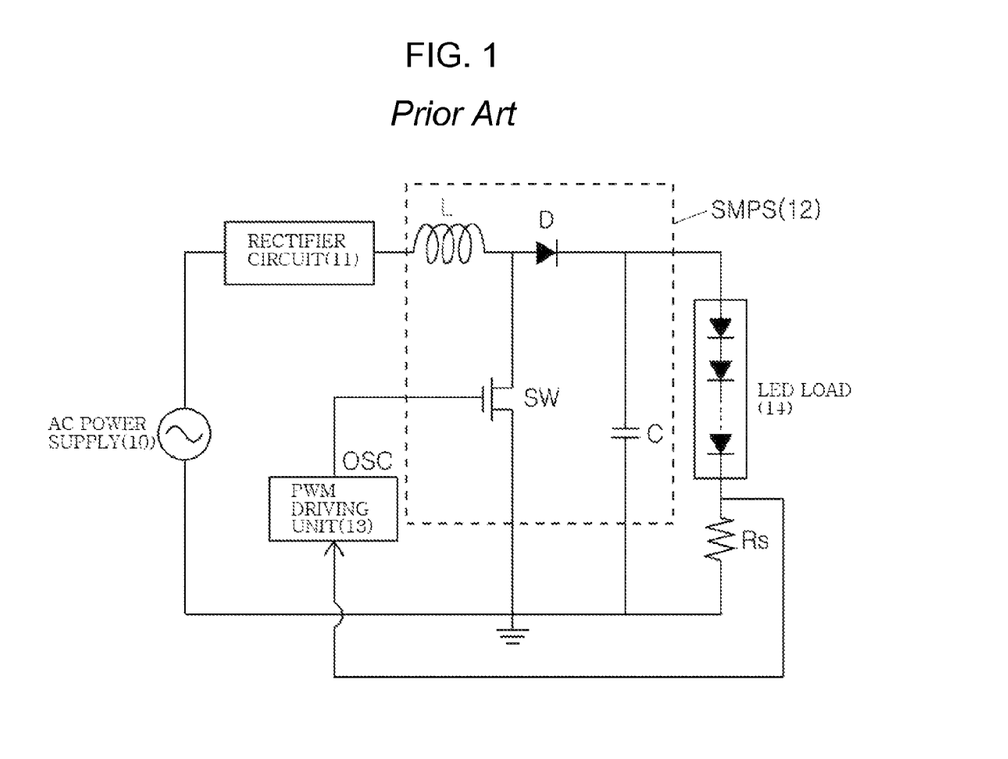
FIG. 1 is a view of a light emitting diode (LED) driving circuit using a switching mode power supply (SMPS) according to the related art.

However, a switching mode power supply (SMPS) method illustrated in FIG. 1 is mainly used in the related art. The SMPS method is a method, whereby an alternating current (AC) power supply 10 is rectified by a rectifier circuit 11, such as a bridge circuit, and then is smoothed by a capacitor C after passing through an SMPS 12 and is supplied to an LED load 14 and a constant load current corresponding to desired brightness flows by adjusting a duty ratio at which a load current is detected by a voltage applied to a resistor Rs, the voltage applied to the resistor Rs is applied to a pulse width modulation (PWM) driving unit 13 and a switch SW is turned on/off.

However, since the LED driving circuit using the SMPS method requires the SMPS 12 having a complicated configuration and the PWM driving unit 13, in a small-sized LED illumination apparatus, such as an LED lamp, it is difficult to install components for these circuits in a narrow space of the LED lamp. In particular, these circuits operate using a pulse method. Thus, many harmonic waves are generated, and an apparatus for suppressing emission of electromagnetic waves resulting from the harmonic waves is additionally required. Of course, the LED driving circuit using the SMPS method of FIG. 1 can boost a voltage using an inductor L and thus can drive more LEDs. An input current of the LED driving circuit follows an input voltage using a sawtooth method, and a duration in which the input current flows, is increased, and a power factor is improved.

Figure 2:
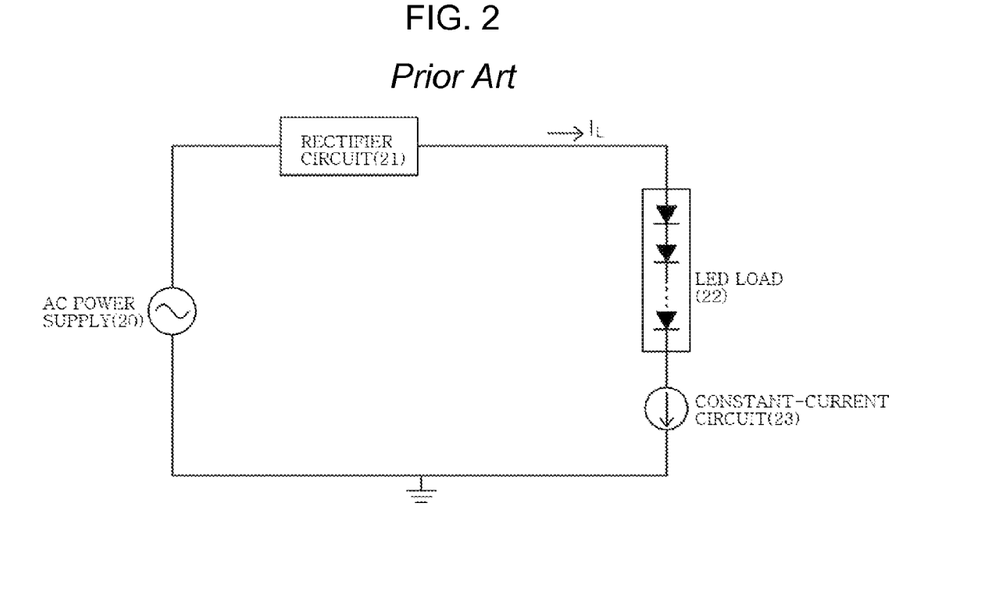
FIG. 2 is a view of an LED driving circuit using a constant-current circuit according to the related art.
Figure 3:
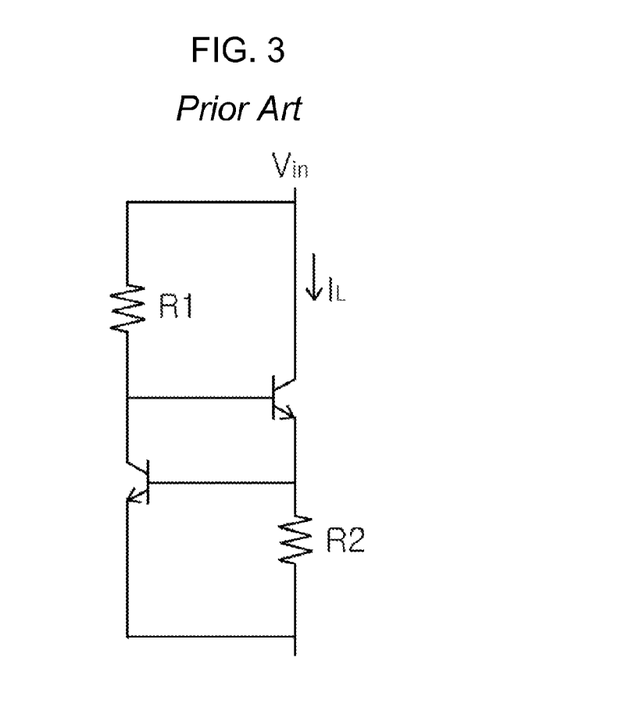
FIG. 3 illustrates an embodiment of a constant-current circuit used in the related art.

Meanwhile, in another related art considering the problems of the LED driving apparatus using the SMPS method, an LED driving circuit using a constant-current circuit method, whereby a constant current flows through an LED load 22 by installing a constant-current circuit 23 using an analog circuit method, is used, as illustrated in FIG. 2. Since the constant-current circuit 23 using this method uses a simple analog circuit shown in FIG. 3 (in FIG. 3, a transistor is used but an operational (OP) amplifier can also be used), a circuit configuration is simple, and the constant-current circuit 23 using the analog circuit method is used so that there are no worries about generation of electromagnetic waves resulting from harmonic waves.

However, the LED driving circuit using the constant-current circuit method of FIG. 2 is not suitable for a general purpose illumination apparatus due to flicker that occurs in the LED driving circuit.

Figure 4:
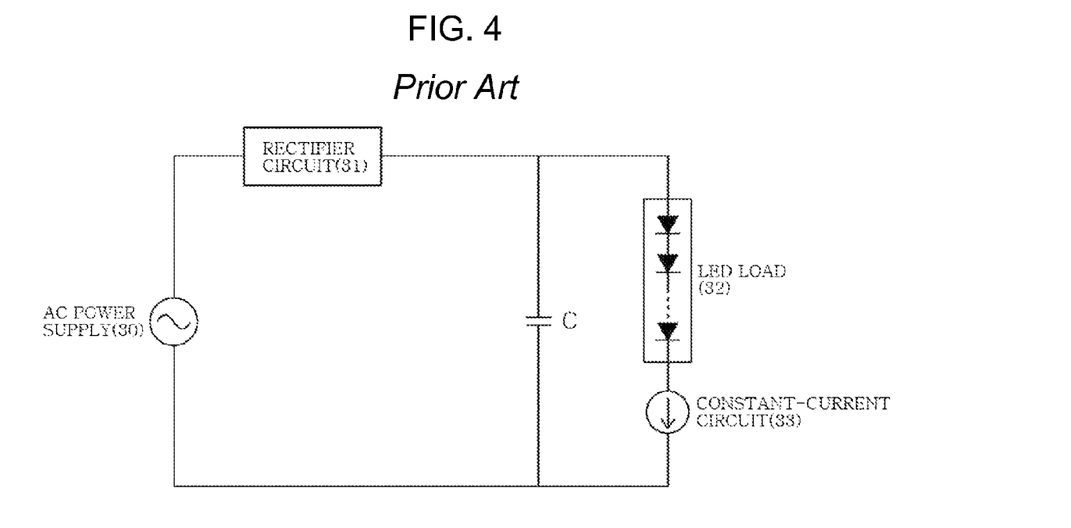
FIG. 4 is a view of an LED driving circuit using a capacitor so as to improve flicker generated in the related art of FIG. 2, according to another related art.

In order to solve the problem of flicker of the LED driving circuit of FIG. 2, the LED driving circuit using the constant-current circuit method according to another related art removes flicker by adding a capacitor C, as illustrated in FIG. 4.

Figure 5:
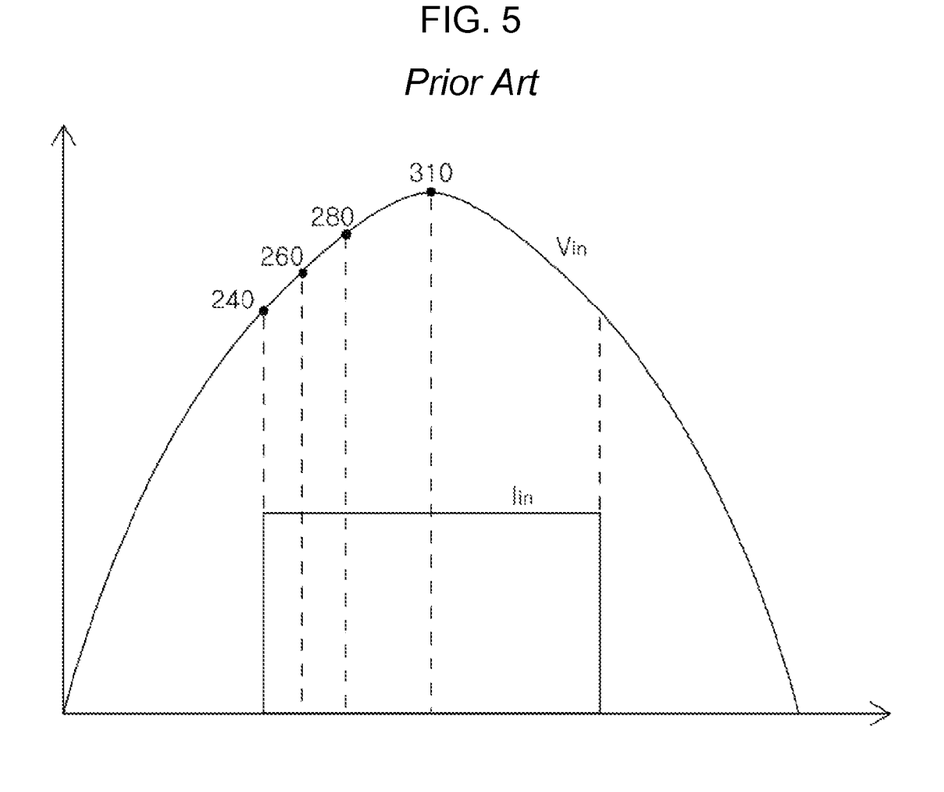
FIG. 5 is a graph showing waveforms of an input voltage and an input current of FIG. 2 that is the related art.

However, for example, in the LED driving circuit using the constant-current circuit method of FIG. 2, if an input AC voltage 20 (Vin) is 220 Vrms (a peak value is about 310 V) and a load voltage (output voltage) $V_L$ applied to the LED load 22 when the LED load 22 is turned on, is 235 V, the input voltage $V_{in}$ and an input current $I_{in}$ have waveforms of FIG. 5. Here, an output current $I_L$ is equal to the input current $I_{in}$, because a circuit is a single loop.

Thus, if a voltage applied to a constant-current source 23 when the LED load 22 starts being turned on, is 5 V, the LED load 22 is turned on in a section in which the input voltage $V_{in}$ is equal to or greater than 240 V (235 V+5 V), and in this case, the load current $I_L$ that is a constant current set in the constant-current source 23 flows through the LED load 22.

However, in general, efficiency is defined as output power $P_L$ at an output terminal=[output current $I_L$×output voltage $V_L$] with respect to input power $P_{in}$ at an input terminal= [input current $I_{in}$×input voltage $V_{in}$]. Since the driving circuit of FIG. 2 is a single loop, the output current $I_L$ and the input current $I_{in}$ that flow through the LED load 22 are constant currents, and input current $I_{in}$=output current $I_L$.

In this case, the output voltage $V_L$ applied to the LED load 22 is constant as 235 V but the waveform of the input voltage $V_{in}$ draws the curve of FIG. 5. Thus, if efficiency is calculated using an approximate method in consideration of FIG. 5, the efficiency is about 86%, like in the following Equation. That is, only 86% of supplied power is used to emit light from the LED load 22, and a power loss of about 14% occurs.

Efficiency=[($I_L$)×(235+235+235+235)/[($I_{in}$)×(240+ 260+280+310)]=940/1090=86.2%

Although the efficiency of about 86% is high in the field of a general illumination apparatus, an LED driving apparatus having higher efficiency is required in an LED illumination apparatus that pursues power-saving.

However, it is generally very difficult to make efficiency 90% or more by further improving comparatively high efficiency of 86%.

DETAILED DESCRIPTION OF THE INVENTION

Technical Problem

The present invention provides a light emitting diode (LED) driving circuit using a new constant-current circuit method, whereby efficiency is further improved compared to an LED driving circuit using a constant-current circuit method according to the related art.

Technical Solution

According to an aspect of the present invention, there is provided a light emitting diode (LED) driving circuit having an efficiency improvement function, the LED driving circuit being connected to an alternating current (AC) power supply, the LED driving circuit including: a rectifier circuit that rectifies the AC power supply; a control circuit connected to an output of the rectifier circuit; an LED load and a constant-current circuit that are connected to an output of the control circuit in series; a capacitor that is connected in parallel to the LED load and the constant-current circuit that are connected in series to each other, the capacitor smoothing the output of the rectifier circuit; and a detection circuit that detects whether the rectified voltage exceeds a predetermined particular voltage value that is equal to or greater than the sum of a voltage applied to the LED load when the LED load is turned on and a voltage applied to the constant-current circuit at a time when the LED load starts being turned on, wherein, if, as a result of detection of the detection circuit, the rectified voltage does not exceed the particular voltage value, the control circuit controls the output of the rectifier circuit to be passed, and if the rectified voltage exceeds the particular voltage value, the control circuit controls so that a first operation of blocking the output of the rectifier circuit and a second operation of passing the output of the rectifier circuit are repeatedly performed.

According to another aspect of the present invention, there is provided a light emitting diode (LED) driving circuit having an efficiency improvement function, the LED driving circuit being connected to an alternating current (AC) power supply, the LED driving circuit including: a rectifier circuit that rectifies the AC power supply; a control circuit connected to an output of the rectifier circuit; an LED load and a constant-current circuit that are connected to an output of the control circuit in series; a current limiting circuit that is connected to the output of the rectifier circuit and controls only a current that is equal to or less than a predetermined current, to flow; a capacitor that is connected in parallel to the LED load and the constant-current circuit that are connected in series to each other, the capacitor smoothing the output of the rectifier circuit; and a detection circuit that detects whether the rectified voltage exceeds a predetermined particular voltage value that is equal to or greater than the sum of a voltage applied to the LED load when the LED load is turned on and a voltage applied to the constant-current circuit at a time when the LED load starts being turned on, wherein, if, as a result of detection of the detection circuit, the rectified voltage does not exceed the particular voltage value, the control circuit controls only a current that is equal to or less than a predetermined current by the current limiting circuit, to be passed, and if the rectified voltage exceeds the particular voltage value, the control circuit controls so that a first operation of blocking an output of the current limiting circuit and a second operation of passing only the current that is equal to or less than the predetermined current by the current limiting circuit are repeatedly performed.

According to another aspect of the present invention, there is provided a light emitting diode (LED) driving circuit having an efficiency improvement function, the LED driving circuit being connected to an alternating current (AC) power supply, the LED driving circuit including: a rectifier circuit that rectifies the AC power; a control circuit connected to an output of the rectifier circuit; an LED load and a constant-current circuit that are connected to an output of the control circuit in series; a capacitor that is connected in parallel to the LED load and the constant-current circuit that are connected in series to each other, the capacitor smoothing the output of the rectifier circuit; and a detection circuit that detects whether the rectified voltage exceeds a predetermined particular voltage value that is equal to or greater than the sum of a voltage applied to the LED load when the LED load is turned on and a voltage applied to the constant-current circuit at a time when the LED load starts being turned on, the detection circuit transmitting control signals according to the degree of exceeding the particular voltage value to the control circuit, wherein the control circuit includes a plurality of current limiting portions, and if, as a result of detection of the detection circuit, the rectified voltage does not exceed the particular voltage value, the control circuit controls all of the plurality of current limiting portions to pass the output of the rectifier circuit, and if the rectified voltage exceeds the particular voltage value, the control circuit controls a number of current limiting portions corresponding to the control signals according to the degree of exceeding the particular voltage value to block the output of the rectifier circuit by a switching operation.

BEST MODE OF THE INVENTION

Hereinafter, the present invention will be described in detail by explaining exemplary embodiments of the invention with reference to the attached drawings.

First, a principle in which efficiency is improved, according to the present invention will be described.

The driving circuit of FIG. 2 that is the related art has waveforms of an input voltage and an input current shown in FIG. 5. A schematic value of efficiency when the driving circuit of FIG. 2 has the input current waveform shown in FIG. 6 (a continuous M-shaped pattern) will be described below. In this case, as described above, input current $I_{in}$=output current $I_L$.

Figure 6:
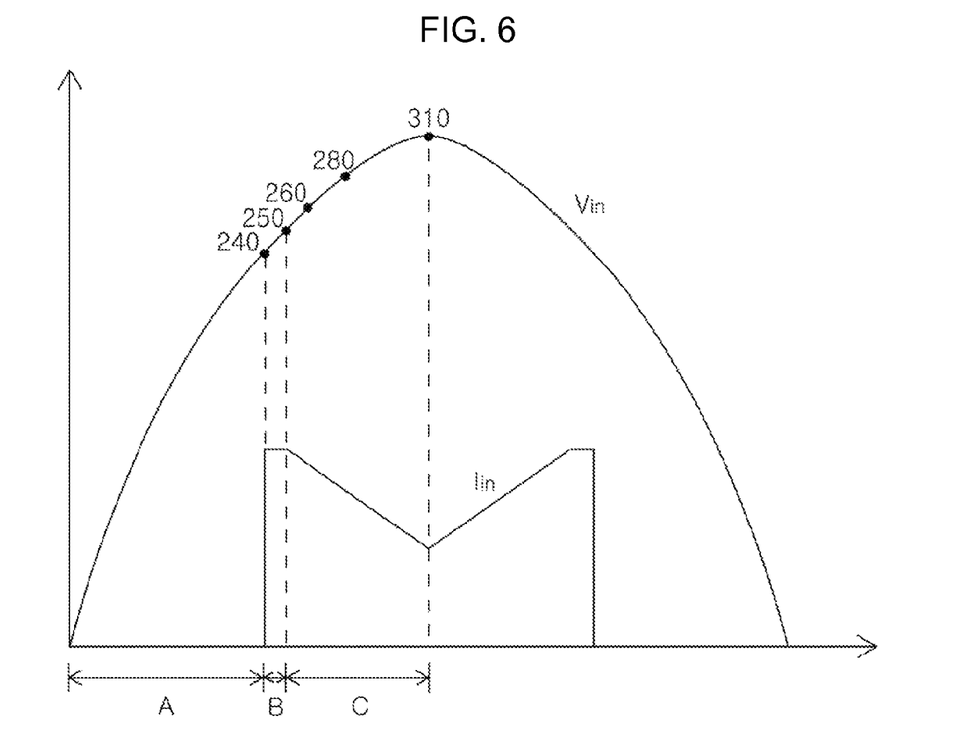
FIG. 6 is a graph showing waveforms of an input voltage and an input current used in the present invention.
Figure 7:
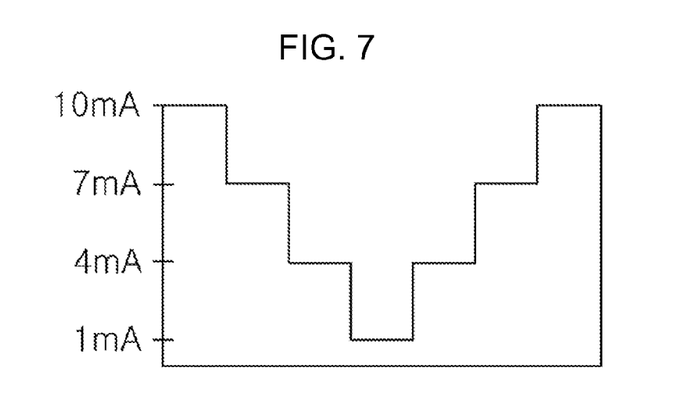
FIG. 7 is a graph showing a waveform of a stepped M-shaped input current for simply calculating efficiency according to a principle of the present invention.

In order to simply calculate an efficiency improvement effect resulting from an input current $I_{in}$ and an output current $I_L$ shown in FIG. 6, M-shaped patterns of the input current $I_{in}$ and the output current $I_L$ of FIG. 6 are simplified as stepped M-shaped patterns shown in FIG. 7.

Now, efficiency according to waveforms of the input current $I_{in}$ and the output current $I_L$ of FIG. 7 will be calculated below by using a method of calculating efficiency in the driving circuit of FIG. 2.

$$\text{Efficiency} = (10 \times 235 + 7 \times 235 + 4 \times 235 + 1 \times 235)/$$
$$(10 \times 240 + 7 \times 260 + 4 \times 280 + 1 \times 310) = 5170/5650 = 91.5\%$$

As a result, compared to a case where an input current and an output current are uniform as 10 mA in the driving circuit of FIG. 2, if the driving circuit has an M-shaped output current pattern (a pattern in which, as an LED load is turned on and an input voltage is increased, an input current is gradually decreased and then as the input voltage passes a peak, the input current is increased again), as illustrated in FIGS. 6 and 7, improvement in efficiency of about 5% can be obtained.

That is, if the output current (input current) is increased or decreased in an opposite direction to a direction in which the input voltage is increased or decreased, under the input voltage in which the LED load is turned on, efficiency is improved.

Figure 8:
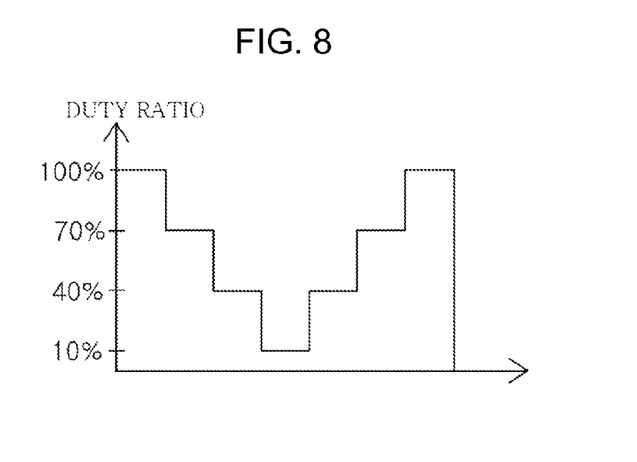
FIG. 8 is a graph showing a waveform of a duty ratio of an input current for achieving improvement in efficiency according to the principle of the present invention.

However, when input current and output current patterns of the stepped M-shaped pattern illustrated in FIG. 7 are configured as having many pulses in each section, instead of uniform currents (10 mA, 7 mA, 4 mA, and 1 mA) in each current section (10 mA section, 7 mA section, 4 mA section, and 1 mA section), the same results as duty ratios (defined as an on time/off time) in each section being 100%, 70%, 40%, and 10%, as illustrated in FIG. 8, are obtained.

That is, even when duty ratios of the input current and output current under the input voltage in which the LED load is turned on, have the M-shaped pattern, the effect of the above-described efficiency improvement is achieved.

As a result, if the LED driving circuit using the constant-current circuit method of FIG. 2 that is the related art is controlled so that the input current that is in inverse proportion to a change in an input voltage flows in a section of the input voltage in which the LED load is turned on, efficiency is considerably improved.

In the M-shaped pattern illustrated in FIG. 6, efficiency improvement is lowered as a constant input current section (section B) is increased. However, more improved efficiency than in the LED driving circuit using the constant-current circuit method of FIG. 2 can be obtained.

Also, in the M-shaped pattern of FIG. 6, as a decrease slope of the input current becomes steep due to an increasing input voltage in a section C, efficiency improvement is increased.

As above, the M-shaped pattern of the input current for achieving the effect of efficiency improvement with respect to the LED driving circuit of FIG. 2 has been described.

However, when a capacitor C is added, as illustrated in FIG. 4, the input current is not the same as the output current due to charging/discharging of the capacitor C.

Even when the capacitor C exists, due to a constant-current circuit 33, a current flowing through an LED load 32 is constant, and a voltage applied to the LED load 32 is also constant.

As a result, output power is almost constant regardless of a case where the input current is constant, as illustrated in FIG. 5 and a case where the input current has an M-shape, as illustrated in FIG. 6.

Thus, in an LED driving circuit of FIG. 4 can calculate efficiency by a change in input power, like in the LED driving circuit of FIG. 2. Thus, the following description will be provided based on an assumption that an output current does not vary according to a capacitor.

Now, a first embodiment of the present invention in which the LED driving circuit using the constant-current circuit method of FIG. 4 is controlled to achieve an output current pattern having M-shaped duty ratios illustrated in FIG. 8, will be described with reference to FIG. 9.

Figure 9:
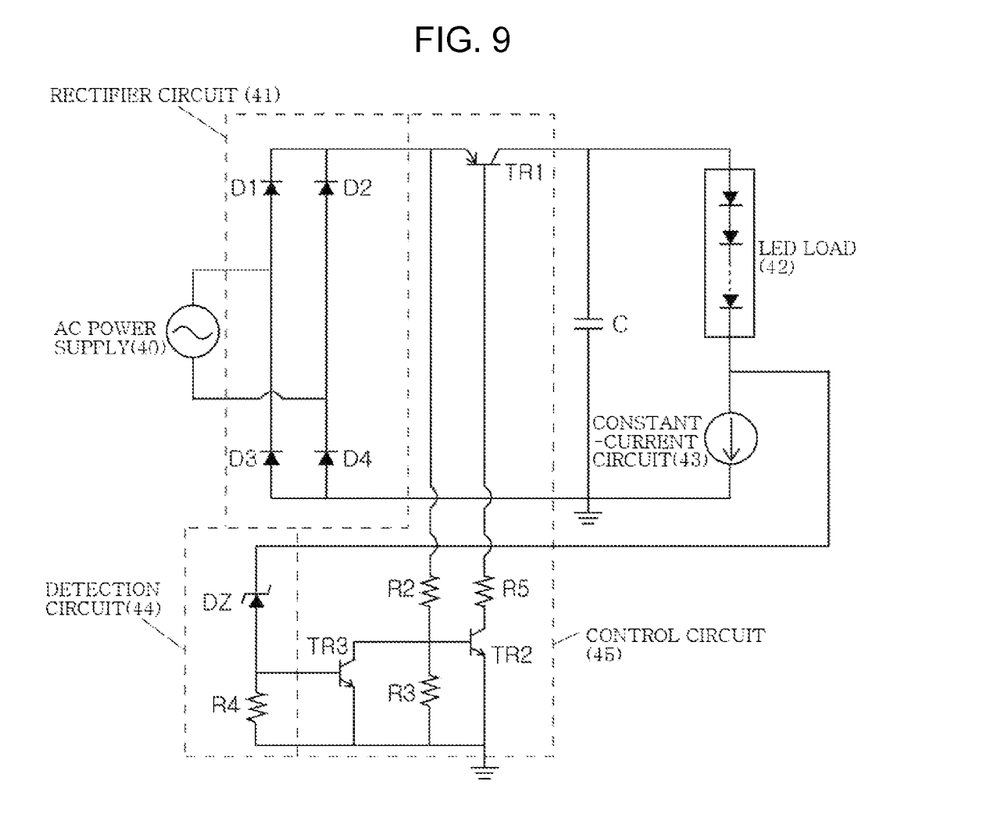
FIG. 9 illustrates a first embodiment of the present invention to which the principle of the present invention is applied to FIG. 4 that is the related art.

As illustrated in FIG. 9, in the LED driving circuit according to the first embodiment of the present invention, if it is assumed that input an alternating current (AC) power supply is a 220 V power supply, a voltage applied to an LED load 42 when the LED load 42 is turned on, i.e., a terminal voltage of the LED load 42, is 235 V, as described above and a voltage applied to a constant current source 43 at a time when the LED load 42 starts being turned on, is 5 V, the LED load 42 is turned on at an input voltage $V_{in}$ of 240 V or more.

A zener diode Dz having a larger breakdown voltage Vz than the voltage 5 V applied to the constant current source 43 when the LED load 42 starts being turned on, is installed at a detection circuit 44. For example, it is assumed that the breakdown voltage Vz=15 V.

Since the LED load 42 is turned off before an input voltage $V_{in}$ becomes 235 V+5 V=240 V (section A of FIG. 6), a smaller voltage than the breakdown voltage Vz is applied to the zener diode Dz and a resistor R4 of the detection circuit 44, and the zener diode Dz is blocked, and 0 V is applied to a base of a transistor TR3 so that the transistor TR3 is turned off.

Then, since a voltage in which an output of a rectifier circuit 41 is divided into a resistor R2 and a resistor R3, is applied to a base of a transistor TR2, the transistor TR2 is turned on, and a current flows through a base of a PNP transistor TR1, and the transistor TR1 is in an on state and thus is in a continuity state.

However, since the input voltage $V_{in}$ is smaller than 240 V at present, the LED load 42 is not turned on yet, and no current flows like in the section A of FIG. 6.

Now, since, in a section in which the input voltage $V_{in}$ is between 240 V and 250 V (section B of FIG. 6), a smaller voltage than the breakdown voltage Vz of 15 V is still applied to the zener diode Dz and the resistor R4, the transistor TR1 is in an on state, and the input voltage $V_{in}$ exceeds 240 V that is the sum of an on voltage 235 V of the LED load 42 and a voltage 5 V applied to the constant-current circuit 43 when the LED load 42 starts being turned on. Thus, the LED load 42 is turned on, and a constant current flows like in the section B of FIG. 6, and charges are accumulated in the capacitor C.

Next, if the input voltage $V_{in}$ starts exceeding 250 V (section C of FIG. 6), a voltage of 15 V or more starts being applied to the constant-current circuit 43, and the voltage applied to the constant-current circuit 43 exceeds 15 V that is the breakdown voltage Vz of the zener diode Dz. A voltage corresponding to the breakdown voltage Vz of 15 V is applied to the zener diode Dz, and the other voltage is applied to the resistor R4, and the transistor TR3 is in an on state.

Then, a low voltage is applied to the base of the transistor TR2. Thus, the transistor TR2 is in an off state, and no current flows through the base of the transistor TR1, and the transistor TR1 is in an off state.

Then, the charges accumulated in the capacitor C are discharged and start being supplied to an LED load 23.

Now, if the voltage applied to the constant-current circuit 43 is decreased by the reduced charges accumulated in the capacitor C, the transistor TR1 is turned on, and charges are accumulated in the capacitor C, and a voltage of 15 V or more that is the breakdown voltage Vz is applied again to the constant-current circuit 43.

Then, a procedure in which the transistor TR1 is blocked and the charges accumulated in the capacitor C are discharged and are supplied to the LED load 42, restarts.

As a result, in the LED driving circuit of FIG. 9, if the input voltage $V_{in}$ exceeds 250 V, the transistor TR1 is repeatedly turned on/off. This on/off repetition phenomenon may be referred to as oscillation.

In this case, as the input voltage $V_{in}$ is increased, charging of the capacitor C is more quickly performed (an on time of the transistor TR1 is reduced), and a voltage when the capacitor C is charged, is higher.

As the voltage when the capacitor C is charged, is higher, time (off time of the transistor TR1) when the charges accumulated in the capacitor C are discharged and the transistor TR1 is turned on again, is further increased.

Thus, in a section in which the input voltage $V_{in}$ is increased, a duty ratio corresponding to an on time/off time of the transistor TR1 is gradually reduced, like in the left section of FIG. 8.

Of course, contrary to this, in a section in which the input voltage $V_{in}$ is decreased, the duty ratio of the transistor TR1 is gradually increased, like in the right section of FIG. 8.

As a result, by using the LED driving circuit using the constant-current circuit method of FIG. 9, input current patterns have M-shaped patterns illustrated in FIGS. 6, 7, and 8. Thus, efficiency is considerably improved compared to FIG. 2 that is the related art.

In this case, if the breakdown voltage Vz=5 V, the LED driving circuit immediately enters the section C without passing the section B of FIG. 6 when the input voltage $V_{in}$ is 240 V or more.

Figure 10:
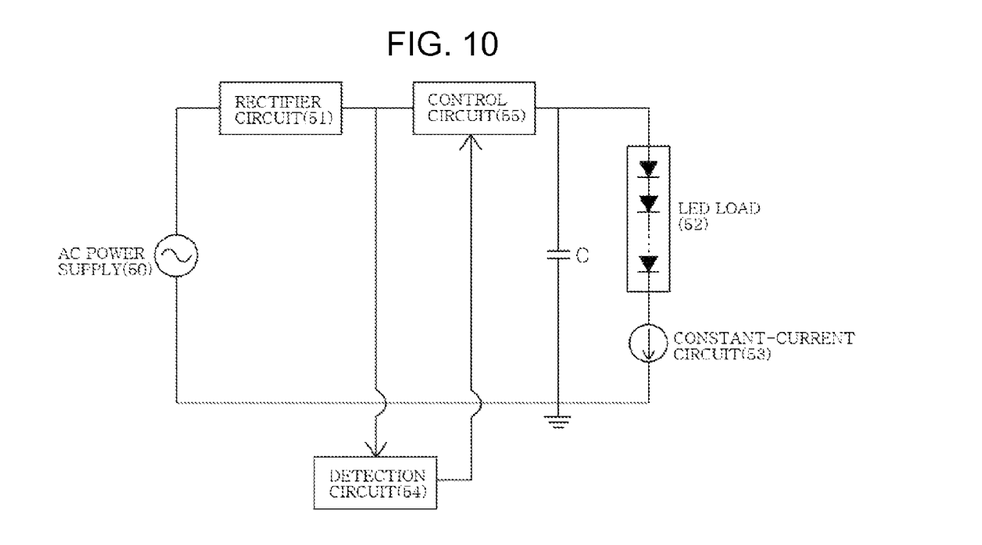
FIG. 10 illustrates a second embodiment of the present invention to which the principle of the present invention is applied to FIG. 4 that is the related art.

In FIG. 9, the detection circuit 44 detects a voltage at the constant-current circuit 43. However, like in FIG. 10, an embodiment in which a voltage is detected at an output of a rectifier circuit 51 (second embodiment), is possible. Of course, in FIG. 9, the detection circuit 44 may also detect a voltage at an input side of the LED load 42.

Now, a third embodiment of the present invention in which the LED circuit of FIG. 9 is improved, will be described with reference to FIG. 11.

In the above operation description of FIG. 9, as the input voltage is increased in the section C of FIG. 6, the input current is linearly decreased. However, in actuality, a delay time exists in the on/off time of the input current due to the effect of internal capacitor components, and as a result of measurement using a measuring instrument, the LED driving circuit of FIG. 9 has an input current pattern that vibrates in a vertical direction around a straight input current pattern in the section C of FIG. 6, like in FIG. 12.

As described above, in the present invention, as a decrease slope of the input current becomes steep due to an increasing input voltage, efficiency improvement is increased.

Figure 11:
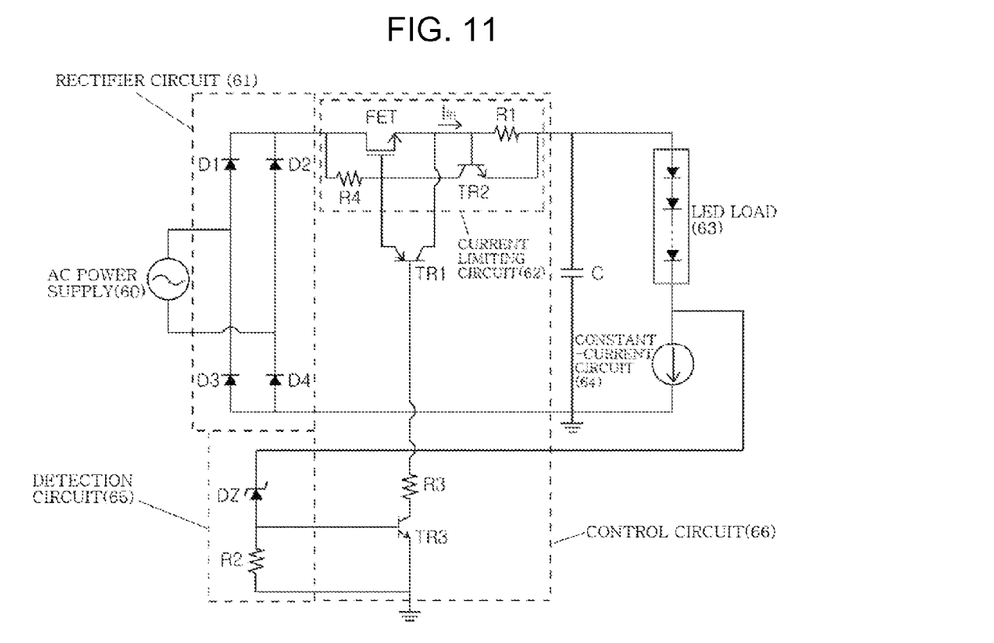
FIG. 11 illustrates a third embodiment of the present invention in which an LED driving circuit of FIG. 9 is improved.
Figure 12:
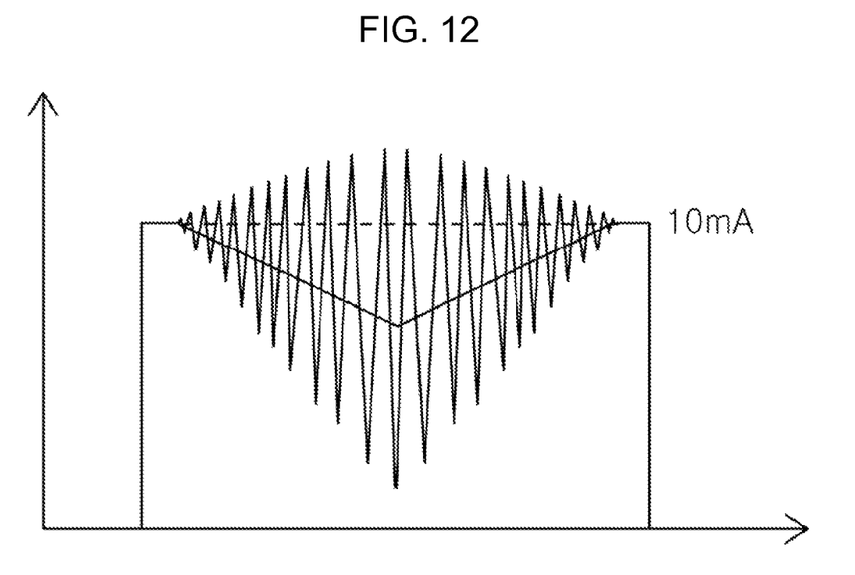
FIG. 12 is a graph showing a waveform of an actual input current that appears in the LED driving circuit of FIG. 9.
Figure 13:
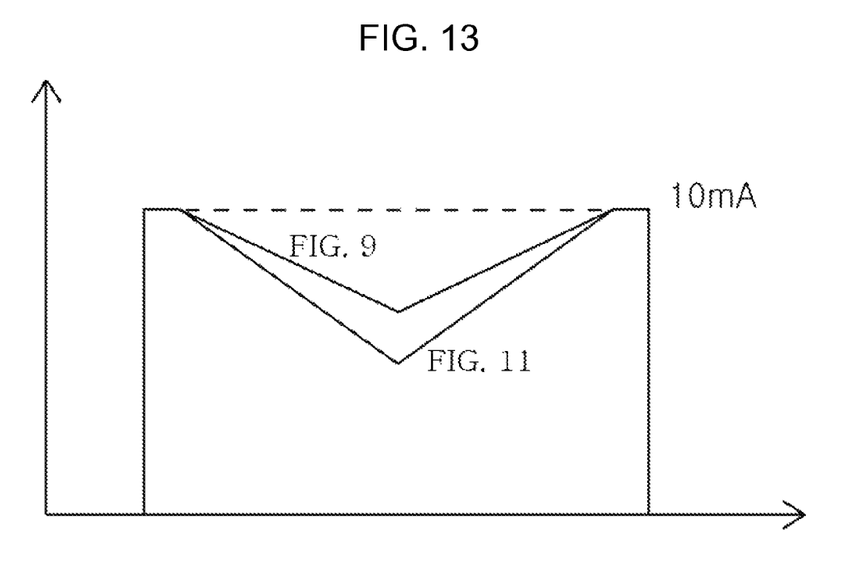
FIG. 13 is a graph for comparing a waveform of an input current of the LED driving circuit of FIG. 9 with a waveform of an input current of the LED driving circuit of FIG. 11.

Thus, in order to further improve efficiency of the driving circuit of FIG. 9, an average input current curve is further lowered in a downward direction, like in FIG. 13, by cutting a portion that exceeds 10 mA (a portion that exceeds a dotted line) that is a constant input current from the input current pattern that vibrates in the vertical direction of FIG. 12. This is an LED driving circuit of FIG. 11.

Now, an operation of the LED driving circuit of FIG. 11 will be briefly described.

In the LED driving circuit of FIG. 11, a zener diode Dz and a resistor R2 constitute a detection circuit 65, and a FET, a transistor TR2, resistors R1 and R4 constitute a current limiting circuit 62.

In the current limiting circuit 62, an input current $I_{in}$ does not exceed a current, for example, 10 mA predetermined by the resistor R1 when the transistor TR1 is turned off. That is, if a current flowing through the resistor R1 exceeds 10 mA, a voltage for turning on the transistor TR2 is applied to a base of the transistor TR2, and if the transistor TR2 is turned on, a voltage applied to a gate of the FET is decreased, and the input current $I_{in}$ is decreased and thus does not exceed 10 mA.

Thus, in the section B in which the input voltage is between 240 V and 250 V, a transistor TR3 is turned off. Thus, if the transistor TR1 is turned off, the input current $I_{in}$ flows as the constant current of 10 mA, and charges are accumulated in the capacitor C.

Now, when the LED driving circuit enters the section C in which the input voltage exceeds 250 V, the transistor TR3 is turned on. Thus, the transistor TR1 is turned on and simultaneously, the FET is turned off, and no input current $I_{in}$ flows, and the charges accumulated in the capacitor C are discharged to an LED load 63.

If the voltage applied to the constant-current circuit 64 is lowered due to discharging of the charges accumulated in the capacitor C, the transistor TR3 is turned off again. Thus, the transistor TR1 is turned off, and simultaneously, the input current $I_{in}$ is supplied to the LED load 63, and charges are accumulated in the capacitor C again.

In this case, a procedure in which a voltage of 15 V (breakdown voltage Vz) or more is again applied to the constant-current circuit 23, the transistor TR3 is turned on again, the transistor TR1 is turned on, the FET is turned off and charges accumulated in the capacitor C are discharged and are supplied to the LED load 63, restarts.

As a result, if the input voltage $V_{in}$ exceeds 250 V, oscillation in which the FET is repeatedly turned on/off, also occurs in the LED driving circuit of FIG. 11.

In this case, since the input current $I_{in}$ does not exceed 10 mA that is predetermined, the current limiting circuit 62 achieved the effect that a portion exceeding 10 mA (a portion above the dotted line) is cut from an oscillation section of FIG. 12 so that, as the input voltage $V_{in}$ is increased, like in FIG. 13, a slope of a decrease curve that is an average value of the input current $I_{in}$ becomes steeper and efficiency of the driving circuit of FIG. 11 is more excellent than efficiency of the driving circuit of FIG. 9.

In FIG. 11, the detection circuit 65 is connected to both ends of the constant-current circuit 64. However, by modifying FIG. 11, a detection circuit may be connected to an output of the rectifier circuit 61, like in FIG. 10. Of course, in FIG. 11, the detection circuit 65 may detect a voltage at an input side of the LED load 63.

Figure 14:
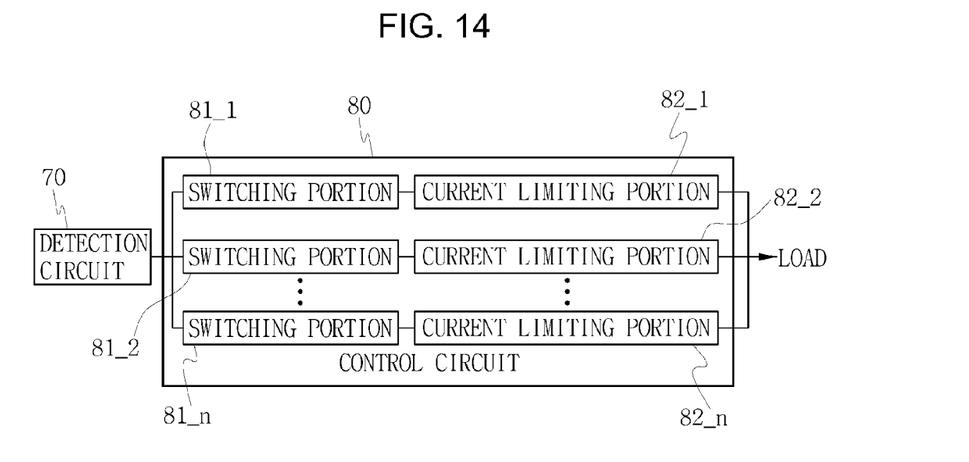
FIG. 14 illustrates a schematic configuration according to a fourth embodiment of the present invention.

Next, an LED driving circuit according to a fourth embodiment of the present invention is as illustrated in FIG. 14.

A load terminal of FIG. 14 may be configured to include a predetermined LED load and a constant-current circuit, and a capacitor that is connected in parallel to the LED load and the constant-current circuit. A rectifier circuit that rectifies an AC power supply may be disposed at a front end of a detection circuit 70. These elements are as described in the previous embodiment and are omitted for convenience. Of course, in FIG. 14, the front end and of the detection circuit 70 and the load terminal may be modified in various embodiments.

As illustrated in the same drawing, the LED driving circuit may include the detection circuit 70 and a control circuit 80. Here, the detection circuit 70 performs a function of detecting whether a rectified voltage exceeds a predetermined particular voltage value and transmitting control signals according to the degree of exceeding the particular voltage value to the control circuit 80.

Here, the predetermined particular voltage value is a value that is larger than the sum of a voltage applied to the LED load when the LED load is turned on and a voltage applied to the constant-current circuit when the LED load starts being turned on.

The control circuit 80 may be connected to an output of the rectifier circuit and the detection circuit 70. In particular, the control circuit 80 may include a plurality of current limiting portions 82_1 through 82_n. Here, the plurality of current limiting portions 82_1 through 82_n may be connected in parallel to each other with respect to a load, as illustrated in FIG. 14.

Also, the control circuit 80 may include switching portions 81_1 through 81_n. Here, the switching portions 81_1 through 81_n are connected to the current limiting portions 82_1 through 82_n and perform a function of turning on/off operations of the current limiting portions 82_1 through 82_n.

In detail, if, as a result of detection of the detection circuit 70, the rectified voltage does not exceed the predetermined particular voltage value, for example, V1, the control circuit 80 performs a function of controlling all of the plurality of current limiting portions 82_1 through 82_n to pass through an output of the rectifier circuit 91, and if the rectified voltage exceeds the particular voltage value, the control circuit 80 performs a function of controlling a number of current limiting portions 82_1 through 82_n corresponding to control signals according to the degree of exceeding the particular voltage value to block the output of the rectifier circuit 91 by a switching operation.

Figure 15:
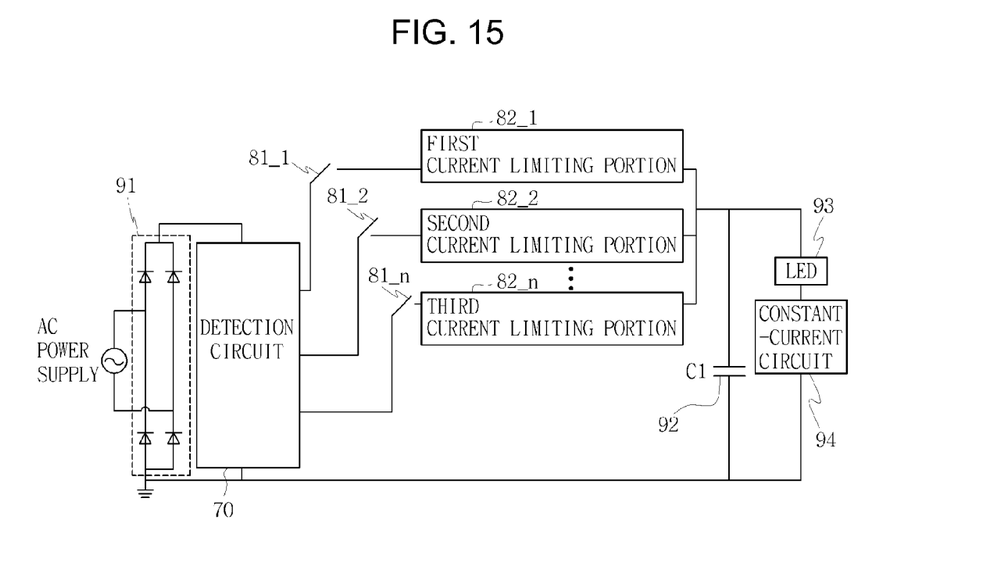
FIGS. 15 and 16 illustrate FIG. 14 in detail.

FIG. 15 illustrates an example of a structure in which a rectifier circuit 91, a capacitor 92 that smoothes the output of the rectifier circuit 91, an LED load 93 and a constant-current circuit 94 are added to the configuration of FIG. 14.

As illustrated in FIG. 15, the detection circuit 70 applies different control signals to the switching portions 81_1 through 81_n according to a magnitude of the rectified voltage, and the switching portions 81_1 through 81_n operate according to the control signals so that the current limiting portions 82_1 through 82_n pass or block the output of the rectifier circuit 91.

Figure 16:
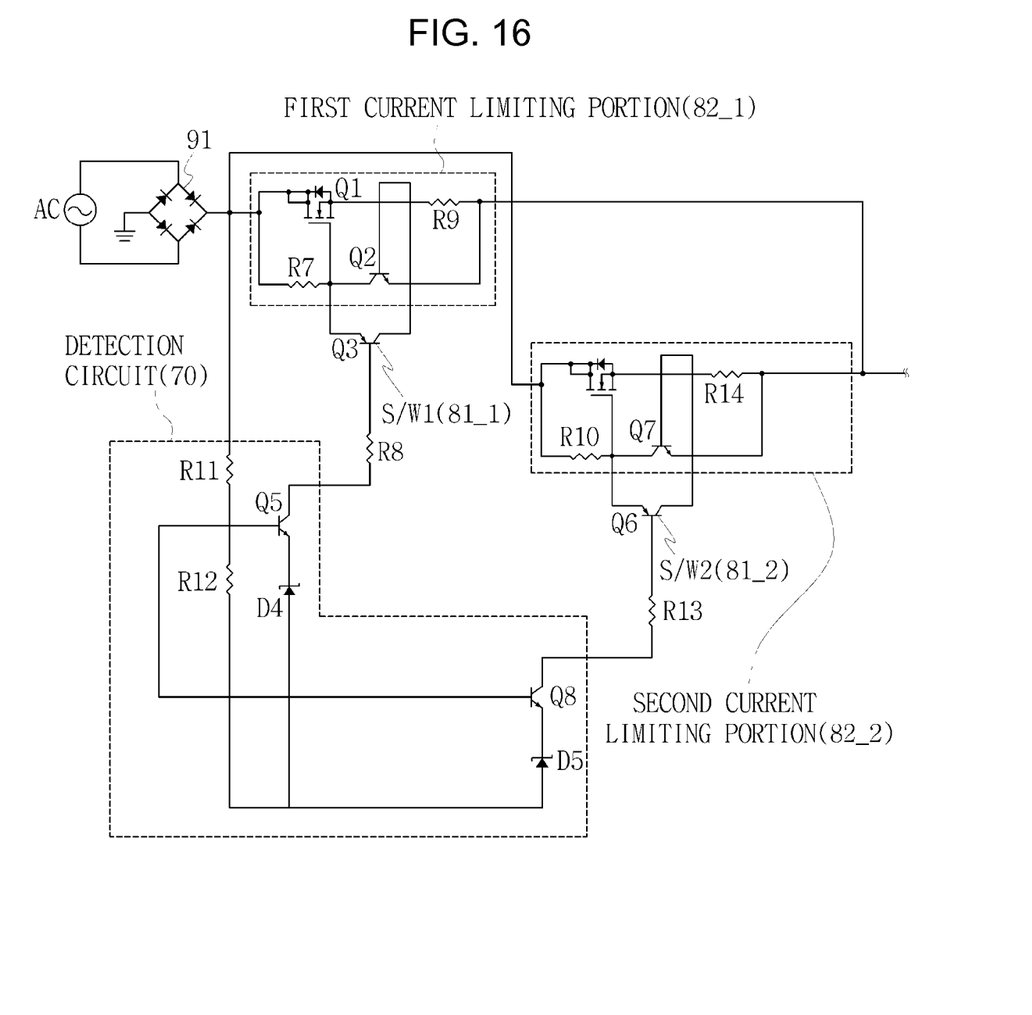

FIG. 16 illustrates an example of a detailed circuit configuration and connection of the detection circuit 70 and the control circuit 80 of FIG. 15.

Referring to FIG. 16, when the switching portions Q3 81_1 and Q6 81_2 are in an off state, the current limiting portions 82_1 and 82_2 pass the output of the rectifier circuit 91, i.e., an output current. In the current embodiment, that is, it is assumed that the current limiting portions 82_1 and 82_2 pass the output current of the rectifier circuit 91 that is limited to 10 mA. Thus, an entire output current passed by the current limiting portions 82_1 and 82_2 is 20 mA.

Q5 of the detection circuit 70 is in an on state when a magnitude of the rectified voltage according to division resistors R11 and R12 and a breakdown voltage of a zener diode D4 is equal to or greater than a predetermined magnitude V1.

Similarly, Q8 of the detection circuit 70 is in an on state when a magnitude of the rectified voltage according to the division resistors R11 and R12 and a breakdown voltage of a zener diode D5 is equal to or greater than a predetermined magnitude V2.

If, as an output voltage of the rectifier circuit 91 is increased and reaches the predetermined magnitude V1, Q5 is in an on state, the switching portion Q3 (81_1) is in an on state. At this time, it is assumed that Q8 (81_2) is not in an on state.

If Q3 is in an on state, the first current limiting portion 82_1 blocks passage of the output current of the rectifier circuit 91. Thus, in this state, an entire output current passed by the current limiting portions 82_1 and 82_2 is 10 mA, because only the effect of the second current limiting portion 82_2 is left.

Next, if, as the output voltage of the rectifier circuit 91 is continuously increased and reaches a predetermined another magnitude V2, Q8 is in an on state, the switching portion Q6 (81_2) is additionally in an on state, and if Q6 (81_2) is in on state, the second current limiting portion 82_2 blocks passage of the output current of the rectifier circuit 91. Thus, in this state, the size of a current passed by the current limiting portions 82_1 through 82_n is 0 mA, because all of the current limiting portions 82_1 through 82_n block the output current.

Contrary to this, if, as the output voltage of the rectifier circuit 91 is decreased and is less than the predetermined magnitude V2, Q8 is in an off state, the switching portion Q6 (81_2) is in an off state, and if Q6 (81_2) is in an off state, the second current limiting portion 82_2 passes the output current of the rectifier circuit 91.

Thus, in this state, the size of an entire current passed by the current limiting portions 82_1 and 82_2 is 10 mA due to the second current limiting portion 82_2.

Also, if the output voltage of the rectifier circuit 91 is further decreased and is less than the predetermined magnitude V1, Q5 is in an off state, the switching portion Q3 (81_1) is in an off state, and if Q3 (81_1) is in an off state, the first current limiting portion 82_1 additionally passes the output current of the rectifier circuit 91. Thus, in this state, the output current passed by the current limiting portions 82_1 and 82_2 is 20 mA due to the first current limiting portion 82_1 and the second current limiting portion 82_2.

In FIG. 16, two switching portions 81_1 and 81_2 and two current limiting portions 82_1 and 82_2 are illustrated. However, the number of switching portions and the number of current limiting portions may be further increased, and when control is performed using the above-described method, the entire quantity of a current supplied to the LED load may vary in stages, as illustrated in FIG. 7.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

As described above, the present invention provides an LED driving circuit using a constant-current circuit method, whereby efficiency is further improved compared to an LED driving circuit using a constant-current circuit method according to the related art.

The invention claimed is:

1. A light emitting diode (LED) driving circuit having an efficiency improvement function, the LED driving circuit being connected to an alternating current (AC) power supply, the LED driving circuit comprising:
   a rectifier circuit connected to the AC power supply to generate a rectified voltage;
   a control circuit connected to an output of the rectifier circuit;
   an LED load and a constant-current circuit connected to an output of the control circuit in series, the LED load and the constant-current circuit being connected in series with each other;
   a capacitor connected in parallel to the LED load and the constant-current circuit, the capacitor being configured to smooth the output of the rectifier circuit; and
   a detection circuit configured to detect whether the rectified voltage exceeds a predetermined voltage value, the predetermined voltage value being equal to or greater than a sum of a voltage applied to the LED load when the LED load is turned on and a voltage applied to the constant-current circuit at a time when the LED load starts being turned on,
   wherein the control circuit is configured to control the output of the rectifier circuit to be passed when the rectified voltage does not exceed the predetermined voltage value, and configured in such a way that a first operation of blocking the output of the rectifier circuit and a second operation of passing the output of the rectifier circuit are repeatedly performed when the rectified voltage exceeds the predetermined voltage value.

2. The LED driving circuit of claim 1, wherein the detection circuit is configured to perform the detection operation at an input of the constant-current circuit.

3. The LED driving circuit of claim 1, wherein the detection circuit is configured to perform the detection operation at an output of the constant-current circuit.

4. The LED driving circuit of claim 1, wherein the detection circuit is configured to perform the detection operation at an input of the LED load.

5. A light emitting diode (LED) driving circuit having an efficiency improvement function, the LED driving circuit being connected to an alternating current (AC) power supply, the LED driving circuit comprising:
   a rectifier circuit connected to the AC power supply;
   a control circuit connected to an output of the rectifier circuit;
   an LED load and a constant-current circuit connected to an output of the control circuit in series, wherein the LED load and the constant-current circuit are connected in series with each other;
   a current limiting circuit connected to the output of the rectifier circuit;
   a capacitor connected in parallel to the LED load and the constant-current circuit, wherein the capacitor is configured to smooth the output of the rectifier circuit; and
   a detection circuit configured to detect whether the rectified voltage exceeds a predetermined voltage value, the predetermined voltage value being equal to or greater than a sum of a voltage applied to the LED load when the LED load is turned on and a voltage applied to the constant-current circuit at a time when the LED load starts being turned on,
   wherein the control circuit is configured to control the current limiting circuit to pass only a predetermined current equal to or less than a predetermined value when the rectified voltage does not exceed the predetermined voltage value, and further configured in such a way that a first operation of blocking an output of the current limiting circuit and a second operation of passing only the predetermined current are repeatedly performed when the rectified voltage exceeds the predetermined voltage value.

6. The LED driving circuit of claim 5, wherein the detection circuit is configured to perform the detection operation at an input of the constant-current circuit.

7. The LED driving circuit of claim 5, wherein the detection circuit is configured to perform the detection operation at an output of the constant-current circuit.

8. The LED driving circuit of claim 5, wherein the detection circuit is configured to perform the detection operation at an input of the LED load.

9. A light emitting diode (LED) driving circuit having an efficiency improvement function, the LED driving circuit being connected to an alternating current (AC) power supply, the LED driving circuit comprising:
   a rectifier circuit connected to the AC power;
   a control circuit connected to an output of the rectifier circuit, wherein the control circuit comprises a plurality of current limiting portions;
   an LED load and a constant-current circuit connected to an output of the control circuit in series, wherein the LED load and the constant-current circuit are connected in series with each other;
   a capacitor connected in parallel to the LED load and the constant-current circuit, wherein the capacitor is configured to smooth the output of the rectifier circuit; and
   a detection circuit configured to detect whether the rectified voltage exceeds a predetermined voltage value, wherein the predetermined voltage value is equal to or greater than a sum of a voltage applied to the LED load when the LED load is turned on and a voltage applied to the constant-current circuit at a time when the LED load starts being turned on, and the detection circuit is configured to transmit control signals to the control circuit according to a degree of exceeding the predetermined voltage value,
   wherein the control circuit is configured to control all of the plurality of current limiting portions to pass the output of the rectifier circuit when the rectified voltage does not exceed the predetermined voltage value, and configured to control a portion of the current limiting portions corresponding to the control signals to block the output of the rectifier circuit by a switching operation when the rectified voltage exceeds the predetermined voltage value.

* * * * *